Patented Aug. 3, 1943

2,325,850

UNITED STATES PATENT OFFICE 2,325,850

PROCESS OF TREATING OIL

Gordon B. Hanson, Houston, Tex., assignor to Petrolite Corporation, Ltd., Wilmington, Del., a corporation of Delaware No Drawing. Application December 27, 1938, Serial No. 247,831

15 Claims. (Cl. 204—190)

This invention relates to a process for treating oil, and more particularly to a process for electrically treating oils to remove therefrom dispersed water-soluble impurities and/or dispersed water.

In the handling of oils, and particularly petroleum, dispersions of water-in-oil are frequently encountered or formed which require resolution or dehydration before the oil can be subjected to further treatment. Various treating processes have been proposed for the resolution of such dispersions, but the present invention is primarily concerned with electric processes which comprise subjection of the dispersion to the action of high-tension electric fields, usually alternating in character.

While such electric treatment usually is effective in causing the desired degree of resolution, there are sometimes troublesome concomitants, and in particular the water which is separated from the dispersion by the action of the electric field may contain small quantities of oil either in the form of dispersed droplets of oil or as coarser aggregates of sludge. Sludge is a term used by the art to denote a coarse interfacial emulsion gathering between the oil and water phases during the process of their separation, and which is sometimes formed in such amount that it pervades the aqueous phase and is withdrawn therewith.

The appearance of such oily water bleeds is not limited to the treatment of naturally occurring emulsion, such as dispersions of oil field brine in crude petroleum. They are also sometimes encountered in electric desalting and similar purification processes in which water is mixed with the oil to form a dispersion which is subsequently resolved by the action of an electric field. For example, it is not uncommon to find a low water content oil containing such an amount of water-soluble or water-wettable impurities as to be objectionable. A relatively large quantity of water, more free of the impurities than the original water, is mixed with such an oil so that droplets of the original and added water coexist in the resulting dispersion, these coexisting droplets being largely coalesced by subsequent subjection to the action of an electric field and the treated constituents settled. The quantity of water dispersed in the oil in such electrical purification processes in general may constitute from 15 to 25% or even more of the volume of the material being electrically treated, and under these conditions a tendency toward oily water bleeds comprising either sludge or dispersed oil may become objectionable.

It has been proposed to combat this tendency toward the formation of oily water bleeds in electric purification processes by appropriately controlling the pH of the water bleed as by the addition of alkaline agents prior to the electric treating step. In many instances, particularly in the cases of certain oils, this method of pH control has given excellent results, permitting the maintenance of an oil-free water bleed over a prolonged period and decreasing or preventing entirely the tendency to form sludge. In other instances, the unmodified use of alkaline agents has failed to give the desired results.

I have discovered that in many instances the difficulties attending the unmodified use of alkaline agents for controlling the pH of the water bleed may be avoided by the use of small quantities of an inorganic inhibitor adapted to retard or prevent the precipitation of certain components of the system by the action of the alkali. In particular I have found that the use of an inhibitor of such kind and in such quantity that the formation of precipitates from the interaction of the added alkali and alkaline earth components of the system is substantially retarded or prevented until the dispersion has been subjected to the action of the electric field, not only permits the full benefits of pH control of the water bleed to be enjoyed in far more instances than formerly, with particular reference to the clarification of the water bleed, but also removes certain other disadvantages sometimes resident in the use of an alkaline material, such as the sealing up and stoppage of lines and other parts of the equipment due to a collection of the precipitates thereon. In addition I have found that in some instances the use of such an inhibitor increases the ease, completeness, and efficiency of the electric treating step to a degree unobtainable with the use of pH control alone.

Various inhibiting agents may be used in accordance with my invention; for example, inorganic materials which exhibit the property, even when present in very small concentration, of delaying or preventing the formation of macroscopic precipitates of insoluble alkaline earth compounds formed by interreaction between the added alkaline agent and alkaline earth compounds. The inhibitor may also consist of or comprise inorganic materials which permanently avoid or prevent the formation of such precipitates. In either instance the amount of precipitation taking place prior to or during the resolution accomplished in the electric field is materially reduced with respect to the amount of formation similarly occurring in the absence of the inhibitor; or, the formation of precipitates may be completely suppressed during this critical period. Various materials exhibit the desired inhibiting property to various degrees. I find pyrophosphates, and in particular sodium hexametaphosphate or other alkali metal hexametaphosphates, to be particularly advantageous as inhibitors. For example, sodium hexametaphosphate when employed in concentrations of a few parts per million, has the property of substantially retarding or delaying the formation of macroscopic precipitates of alkaline earth hydroxides, carbonates, and the like normally arising when the pH of a water containing dissolved alkaline earth compounds is materially increased by the addition of an alkali. Similar effects are obtained when the hexametaphosphate is used in about $\frac{1}{1000}$ the quantity stoichiometrically equivalent to the calcium ion in the system being treated. At substantially higher concentrations at which the hexametaphosphate is at least stoichiometrically equivalent to the alkaline earth compounds, the formation of precipitates may be permanently avoided.

The prevention or retardation of precipitation by the inhibitors such as sodium hexametaphosphate aids in the realization of the general objects of my invention; namely, the maintenance of oil-free water bleeds, the avoidance of sludge, and, in general, improved efficiency in the electrical treating step and in the purification process of which such a step may be a part. Certain specific advantages may also accrue and may best be considered from the standpoint of the disadvantages which may appear in a process in which such precipitates are allowed to form. These disadvantages are best illustrated by reference to a desalting process such as follows:

A flowing stream of oil containing dispersed oil field brine or other water-soluble impurities is admixed with 20 to 30% of water and an oil continuous dispersion prepared therefrom by passage through a suitable mixing valve. The dispersion thus obtained is passed to an electric treater in which the entering dispersion is subjected to the action of a high-potential alternating electric field. The electric field may be produced by two oppositely charged electrodes between which the entering emulsion is caused to flow. Under the action of the electric field the dispersed particles of the original brine and/or water-soluble impurities and added water coalesce at least partially to masses large enough to respond to gravitational settling. This settling may conveniently take place in the same vessel in which the electrodes are housed, the water masses settling downward to join the lower body of water and the oil, substantially freed from brine and dispersed water, rising to the top, exit pipes being provided at the bottom and top for the water and oil respectively. Normally, sufficient caustic alkali, soda ash, or similar alkaline agent is added to the system to maintain a pH from 8 to 12 in the water bled from the system. The formation of precipitates arises from the action of this added alkali or alkaline earth compounds present in the brine contained in the oil or in the added water or both. These precipitates which may comprise alkaline earth carbonates, hydroxides, and the like, start to form as soon as the alkali is brought into contact with hard water. The usual practice is to inject the desired amount of alkali into the water stream immediately prior to admixture thereof with the oil. Under these circumstances the undesired precipitate is formed in the water stream before and during its dispersal in the oil. The precipitate which is visible and macroscopic in character tends to collect at the oil-water interface and even to become partially wetted by the oil, thereby stabilizing the dispersion to such an extent that subsequent resolution thereof in the dehydrator becomes increasingly difficult. Furthermore, even though the electric field partially coalesces the particles thus stabilized, the settling masses of water carry down with them stabilized films comprising partially oil wet precipitate which gather at the interface between the oil and water in the form of the undesired sludge. In some instances the precipitate also promotes the formation of an inverse or water continuous emulsion so that the water bleed contains dispersed oil droplets as well as sludge. Generally speaking, the desired characteristics of the system are disturbed to such a degree by the formation of the precipitates therein that the advantages of pH control or alkalinization may be more than offset thereby and in the presence of substantial quantities of such precipitates it may be found impossible to obtain the desired degree of resolution or to maintain a clear water bleed free from sludge or dispersed oil.

In addition to the disturbing effects on the characteristics of the oil-water system, the precipitates also occasion numerous mechanical difficulties due to their tendency to accumulate or build up in valves, nozzles, lines, and the like, thereby necessitating frequent dismantling and cleaning of the equipment.

My invention, which is based on the discovery that the characteristics of the oil-water system are adversely influenced by the appearance of these precipitates, consists broadly in modifying the action of the alkaline agent added to the water by the addition of an inorganic inhibitor of the kind disclosed and which is adapted to prevent or retard the formation of such precipitates. The inhibitor may be variously introduced into the system but should be effectively present at the time the alkali is brought into reacting contact with the alkaline earth compound. I usually prefer to add the inhibitor to the alkaline agent before the latter is added to the water stream, but if desired the inhibitor may be added to the water before contacting the latter with an alkali. Where the alkali and inhibitor are separately added to the water, the inhibitor should be added first. Furthermore, my invention resides in the provision of certain specific inhibitors for the above purpose, and in particular alkali metal hexametaphosphates when used in a concentration of only a few parts per million; for example, from 2 to 20 p. p. m. based on the water content, or when used in quantities about $\frac{1}{1000}$ that stoichiometrically equivalent to the alkaline earth compounds.

The quantity of inhibitor used is preferably adjusted to give substantial retardation of precipitation at least through the period in which the dispersion is subjected to the action of the electric field. I find that in most instances from about 2 to about 20 parts per million of sodium hexametaphosphate based on the separated water suffices to substantially retard precipitation during at least this period and to materially improve the treatment. In some instances retardation over a longer period, for example a period including the substantial settling of the coalesced water masses, has been found beneficial and may be realized by the use of suitably larger proportions of the inhibitor. Excellent results may also be obtained by using much larger quantities of the sodium hexametaphosphate, for example, a quantity at least stoichiometrically equivalent to the alkaline earth compounds in the separated water, under which conditions precipitation may be permanently avoided. In practice, however, I usually prefer to use the smaller range of concentrations as affording the more economical operation.

It is to be understood that the above examples are illustrative rather than restrictive, and that various modifications may be practiced which embody my invention as defined in the appended claims.

I claim as my invention:

1. In a process comprising the electrical resolution of an oil continuous emulsion in which the continuous phase comprises a mineral oil and the dispersed phase comprises droplets of added water, said emulsion containing water-soluble alkaline earth compounds and an added alkaline agent, by subjecting said emulsion to the action of a high tension electric field, the step of adding an inhibitor selected from the class consisting of alkali metal hexametaphosphates and pyrophosphates prior to reactive contact of said alkaline agent and said alkaline earth compounds, said inhibitor being added in a quantity adapted to substantially retard precipitation of insoluble alkaline earth compounds for at least a period including the subjection of said emulsion to the action of the electric field.

2. A process as in claim 1 in which the inhibitor is an alkali metal hexametaphosphate.

3. A process as in claim 1 in which the inhibitor is an alkali metal hexametaphosphate, and is added in such quantity as to give a concentration of a few parts per million thereof on the basis of the water content of the emulsion electrically treated.

4. A process as in claim 1 in which the inhibitor is an alkali metal hexametaphosphate and is added in a quantity at least stoichiometrically equivalent to the alkaline earth compounds.

5. A process for removing dispersed water-soluble impurities such as oil field brine from oil which comprises: dispersing alkalinized inhibited water in said oil; subjecting the dispersion thus formed to the action of a high tension electric field, whereby the dispersed impurities and added droplets of water are coalesced to masses sufficiently large to respond to gravitational settling; settling the dispersion thus treated to form a layer of oil substantially freed from said impurities and a layer of water comprising the extracted impurities; and separately recovering the purified oil, said alkalinized inhibited water being characterized by a sufficient content of alkaline material to maintain the pH of the water separating from the treated oil within the range of 8 to 12, and by a content of alkali metal hexametaphosphate sufficient to inhibit substantial precipitation of insoluble alkaline earth compounds normally arising from the action of the alkaline material on any water-soluble alkaline earth salts present in the system, said inhibition being effective at least until the coalesced masses leave the field of electric action.

6. A process as in claim 5 in which the system contains calcium ions and in which the alkali metal hexametaphosphate is added in a quantity about 1/1000 of that stoichiometrically equivalent to the calcium which it is desired to inhibit.

7. A process for removing water-dispersible impurities from a mineral oil which comprises: dispersing water and an alkali in the oil containing the impurities to form a water-in-oil emulsion containing water-soluble alkaline earth compounds; subjecting the dispersion to the action of an electric field to coalesce the dispersed particles; separating the coalesced masses, comprising added water and impurities, from the oil; and maintaining a sufficient concentration of an inhibitor selected from the class consisting of alkali metal hexametaphosphates and pyrophosphates in the dispersion subjected to the electric field to prevent the progressive accumulation of sludge in the separating bodies of water and oil.

8. A process for electrically treating synthetic alkalinized emulsions of the water-in-oil type which tend to produce sludge accumulations upon treatment by the electric field, said emulsions comprising a continuous phase of mineral oil and a dispersed phase comprising droplets of added water, said emulsion containing water-soluble alkaline earth compounds, which process includes the steps of: producing said synthetic emulsion by mixing the added water with the oil while there is present an inhibitor of the type tending to prevent formation of insoluble alkaline earth materials by reaction between the alkali and said water-soluble alkaline earth compounds, said inhibitor being selected from the class consisting of alkali metal hexametaphosphates and pyrophosphates; electrically treating the emulsion thus modified to resolve the emulsion and cause the water to separate from the oil; and controlling the quantity of the inhibitor thus added to prevent the progressive accumulation of sludge in the zone of separation.

9. In the electrical treatment of mineral oils of low water content containing water-soluble alkaline earth compounds to remove impurities such as water-soluble and water-wettable materials by the process of mixing the oil with alkalinized water which is relatively free of said impurities to form an emulsion containing droplets of the added water coexisting with impurities and electrically treating the resulting emulsion to coalesce the coexisting droplets preparatory to separation of the coalesced water masses, an improvement for retarding precipitation of insoluble alkaline earth materials by reaction of said water-soluble alkaline earth compounds with the alkaline material of the added water to better the electric treatment, decrease the tendency to form oily water bleeds, and decrease the accumulation of sludge during said separation, which sludge tends to be stabilized by the interfacial presence of such insoluble alkaline earth precipitates, which improvement includes adding an inhibitor to the added water at a time before mixture of the water with said oil and at a time no later than the time of alkalinizing said added water, said inhibitor being taken from the class consisting of alkali metal hexametaphosphates and pyrophosphates, the amount of said inhibitor being sufficient to inhibit substantial precipitation of insoluble alkaline earth compounds at least until the coalesced masses of water leave the electric field.

10. A process for removing impurities such as water-soluble and water-wettable materials from a mineral oil of low water content containing water-soluble alkaline earth compounds by use of added alkalinized water which is relatively free of said impurities, which process includes the steps of: alkalinizing said water in the presence of an inhibitor taken from the class consisting of alkali metal hexametaphosphates and pyrophosphates capable of retarding precipitation of insoluble alkaline earth materials upon reaction of alkaline material with water-soluble alkaline earth compounds in the system; mixing this water with the oil to form an oil-continuous emulsion in which droplets of the added water coexist with the impurities; subjecting the emulsion to the action of an electric field to coalesce the water and associate the impurities therewith; and separating the coalesced water masses from the oil, the amount of said inhibitor being from about 2 to 20 parts per million based on the separated water.

11. A process for removing impurities such as water-soluble and water-wettable materials from a mineral oil of low water content containing water-soluble alkaline earth compounds by use of added alkalinized water which is relatively free of said impurities and which contains small amounts of alkaline earth compounds, which process includes the steps of: alkalinizing said water in the presence of an inhibitor taken from the class consisting of alkali metal hexametaphosphates and pyrophosphates capable of retarding precipitation of insoluble alkaline earth materials upon reaction of alkaline material with water-soluble alkaline earth compounds in the system; mixing this water with the oil to form an oil-continuous emulsion in which droplets of the added water coexist with the impurities; subjecting the emulsion to the action of an electric field to coalesce the water and associate the impurities therewith; and separating the coalesced water masses from the oil, the amount of said inhibitor being between $1/1000$ of that amount stoichiometrically equivalent to said water-soluble alkaline earth compounds and said stoichiometrically equivalent amount.

12. A process for removing impurities such as water-soluble and water-wettable materials from a mineral oil of low water content containing water-soluble alkaline earth compounds by use of added alkalinized water which is relatively free of said impurities, which process includes the steps of: adding an inhibitor to said water before alkalinization thereof, said inhibitor being taken from the class consisting of alkali metal hexametaphosphates and pyrophosphates capable of retarding precipitation of insoluble alkaline earth materials upon reaction of alkaline material with water-soluble alkaline earth compounds in the system; mixing this water with the oil to form an oil-continuous emulsion in which droplets of the added water coexist with the impurities; subjecting the emulsion to the action of an electric field to coalesce the water and associate the impurities therewith; and separating the coalesced water masses from the oil, the amount of said inhibitor being from about 2 to 20 parts per million based on the separated water.

13. A process as defined in claim 9, in which said inhibitor is added to the added water with the alkaline material used for alkalinizing this added water.

14. In the electrical treatment of mineral oils in which are present dispersed droplets of brine containing water-soluble alkaline earth compounds to remove impurities from said oils such as water-soluble and water-wettable materials by use of an alkalinized water which is relatively free of said impurities but which also contains water-soluble alkaline earth compounds and which water is alkalinized prior to being mixed with said oil, an improvement including the steps of: adding to said water before mixing thereof with said oil and at a time no later than the time this water is alkalinized an inhibitor taken from the class consisting of alkali metal hexametaphosphates and pyrophosphates; mixing the resulting water with the oil to form an emulsion containing coexisting droplets of brine and added water; subjecting said emulsion to the action of an electric field to coalesce coexisting droplets of brine and added water to bring together the water-soluble alkaline earth compounds of said brine and the alkaline material present in the droplets of added water, the amount of said inhibitor being sufficient to substantially prevent formation of insoluble alkaline earth materials when the added water is alkalinized and also sufficient to prevent formation of insoluble alkaline earth materials when the alkali of the added water is brought by coalescence with the brine droplets into the presence of the water-soluble alkaline earth compounds of said brine droplets and during the time said emulsion is subjected to the action of said electric field; and separating the coalesced masses from the oil.

15. A process as defined in claim 14, in which the amount of said inhibitor is increased additionally to substantially inhibit formation of said insoluble alkaline earth compounds during settling of the coalesced water masses from the oil.

GORDON B. HANSON.